United States Patent
Schmidt

(10) Patent No.: US 8,848,332 B2
(45) Date of Patent: Sep. 30, 2014

(54) INTRINSICALLY SAFE ENERGY LIMITING CIRCUIT

(71) Applicant: Siemens Aktiengesellschaft, Munich (DE)

(72) Inventor: Glen Eugene Schmidt, Bartlesville, OK (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/715,108

(22) Filed: Dec. 14, 2012

(65) Prior Publication Data

US 2013/0155564 A1    Jun. 20, 2013

(30) Foreign Application Priority Data

Dec. 15, 2011  (EP) .................................... 11193871

(51) Int. Cl.
 *H02H 1/04*  (2006.01)
 *H02H 9/00*  (2006.01)
 *H02H 9/02*  (2006.01)

(52) U.S. Cl.
 CPC ........ *H02H 9/02* (2013.01); *H02H 9/008* (2013.01)
 USPC .......................................... 361/111; 361/93.9

(58) Field of Classification Search
 USPC ................................................ 361/93.9, 111
 See application file for complete search history.

(56) References Cited

U.S. PATENT DOCUMENTS

| 3,813,578 | A | 5/1974 | Tiffany |
| 3,955,132 | A | 5/1976 | Greenwood |
| 4,024,449 | A * | 5/1977 | Burrie et al. ..................... 363/34 |
| 4,438,473 | A * | 3/1984 | Cawley et al. ................... 361/18 |
| 4,763,069 | A | 8/1988 | Landrini |
| 4,800,331 | A | 1/1989 | Vesce et al. |
| 5,365,420 | A * | 11/1994 | Cadman .......................... 363/50 |
| 7,463,470 | B2 * | 12/2008 | Lark .............................. 361/111 |
| 7,852,610 | B2 | 12/2010 | Uhlenberg et al. |
| 2004/0080890 | A1 * | 4/2004 | Ramsay et al. ............... 361/93.1 |
| 2006/0164780 | A1 * | 7/2006 | Lark .............................. 361/118 |
| 2007/0183108 | A1 * | 8/2007 | Uhlenberg et al. ........... 361/91.1 |
| 2013/0155564 | A1 * | 6/2013 | Schmidt ....................... 361/93.9 |

FOREIGN PATENT DOCUMENTS

| DE | 39 31 537 | 4/1991 |
| EP | 0 310 280 | 4/1989 |
| FR | 2 239 790 | 2/1975 |

OTHER PUBLICATIONS

Eaton, B. et al., "Putting proximity sensors to work in hazardous areas", Control Solutions, Pennwell Publishing, Tulsa, OK, US, vol. 68, No. 5, May 1, 1995, pp. 45-49, XP0000508355.

* cited by examiner

Primary Examiner — Ronald W Leja
(74) Attorney, Agent, or Firm — Cozen O'Connor

(57) ABSTRACT

An intrinsically safe energy limiting circuit for connection between an upstream DC power source and a downstream electrical load powered from the upstream DC power source, wherein the circuit comprises from upstream to downstream an input to be connected to the DC power source, an electronic current limiter configured to limit a current through the circuit to a maximum value if the current reaches this value, a fuse designed to open at a current value greater than the maximum value, a DC-to-DC converter configured to convert a DC input voltage to a lower nominal DC output voltage, a zener barrier having a zener voltage higher than the DC output voltage, and an output for connection to the electrical load.

10 Claims, 2 Drawing Sheets

INTRINSICALLY SAFE ENERGY LIMITING CIRCUIT

BACKGROUND OF THE INVENTION

1. Field of the Invention

The invention relates to an intrinsically safe energy limiting circuit to be connected between an upstream DC power source and a downstream electrical load powered from that source.

2. Description of the Related Art

Intrinsic safety (IS) is a protection concept for safe operation of electrical equipment in explosive atmospheres and under irregular operating conditions. This concept, which is subject to a number of standards, relies on ensuring that the available electrical and thermal energy in the equipment is always low enough that ignition of the hazardous atmosphere cannot occur. In order to limit the electrical energy provided to the equipment, it is necessary to limit both current and voltage. The voltage is usually limited by a zener barrier. A series resistor between the zener barrier and the powered equipment provides instantaneous current limiting to prevent sparking or arcing when the current is interrupted. Furthermore, the current is limited to a safe value by a melting fuse between the power source and the zener barrier. As the input voltage provided by the power source is normally higher than the zener voltage, an additional resistor in series with the fuse is provided to prevent the fuse opening when exposed to a normal inrush current and to limit the continuous current through the zener barrier by dissipating the power imposed by the difference between the zener voltage and the input voltage.

From U.S. Pat. No. 7,852,610 B2 it is known to use a DC-to-DC converter to reduce the voltage provided by the upstream DC power source to a desired level for input into a conventional energy-limiting barrier. As there is no need for further voltage stabilization, the zener barrier of the energy-limiting barrier has a zener voltage higher than the nominal output voltage of the DC-to-DC converter.

As there is normally no additional current flow in the zener barrier and as modern switch-mode DC-to-DC converters have very low power conversion losses, it may be desirable to have two or more equipments (or more generally electrical loads) powered by the same upstream DC power source, each equipment or load receiving an individual output voltage from its own DC-to-DC converter and being protected by its own energy-limiting barrier. However, it may be a disadvantage that each conventional energy-limiting barrier has its own fuse because intrinsically safe fuses are expensive. Additionally, evaluation of the intrinsically safe circuit becomes more complex with two or more fuses, where the downstream devices are not separated electrically and the current is potentially shared between the fuses under normal or fault conditions. In this case, the current through both fuses may have to be combined as part of a fault scenario. This has the result of a difficult safety certification.

Another aspect is that intrinsic safety requires a certain distance between the two sides of a series protective element such as a fuse. The practicality of keeping both sides of the fuse separated in the middle of a circuitry is much harder than having the fuse up front in the physical layout of the circuit.

SUMMARY OF THE INVENTION

It is therefore an object of the present invention to provide a new and improved electrical barrier for use between a power supply and an electrical load used in a potentially explosive area.

This and other objects and advantages are achieved in accordance with the present invention by providing an intrinsically safe energy limiting circuit to be connected between an upstream DC power source and a downstream electrical load powered from that source, where the circuit comprises from upstream to downstream an input to be connected to the DC power source, an electronic current limiter configured to limit a current through the circuit to a maximum value if the current reaches this value, a fuse designed to open at a current value greater than the maximum value, a DC-to-DC converter configured to convert a DC input voltage to a lower nominal DC output voltage, a zener barrier having a zener voltage higher than the DC output voltage, and an output to be connected to the electrical load.

In many or most cases there may be a series resistor between the zener barrier and the load; however the resistor can be omitted depending on the kind of load.

Thus, in accordance with the invention, the fuse is arranged upstream from the DC-to-DC converter and further protected by the electronic current limiter. This allows to easily arrange the fuse up front in the physical layout of the circuit and to keep both sides of the fuse well separated.

Further, the energy limiting circuit may be expanded to intrinsically safe power two or more loads requiring individual output voltages from a single upstream DC power source, and this without the need of additional intrinsically safe fuses. In this case, the energy limiting circuit of the invention further comprises for each further electrical load to be powered, a further DC-to-DC converter downstream connected to said fuse and configured to convert the DC input voltage to a further lower DC output voltage, a further zener barrier having a zener voltage higher than the further DC output voltage, and a further output to be connected to the further electrical load.

The DC-to-DC converter converts the DC input voltage to a lower stabilized DC output voltage at very low power conversion losses. At a fixed load, the input current of the DC-to-DC converter is inversely proportional to the input voltage, because the input power is constant. Thus, at low input voltages, the input current will go up accordingly. For example, while powering up, the DC-to-DC converter may start operation at ⅓ of the nominal input voltage, which increases the input current to three times its normal value. In addition, the switching converter, when just getting started and until it has fully established its output in regulation, is very inefficient with large inrush currents. As a DC-to-DC converter normally has an input capacitance, the inrush current on the capacitance can increase the value even further. Clearly, this would open the fuse. The safety regulations, however, do not allow repair of an intrinsically safe device with the result that the intrinsically safe fuse must not be replaced. Therefore, in accordance with the invention, the electronic current limiter is provided to protect the fuse. The current limiter is a non-IS component, and in case this component fails, the fuse will fulfill its purpose as an IS component.

Electronic current limiters are well known in the field of electronics and usually comprise a current sensor, a semiconductor series pass element in series with the current sensor and a control circuit responsive to the current sensor and providing a control signal to the semiconductor series pass element to limit the current through the circuit. In order to effectively protect the fuse and at the same time allow for maximum current draw, a precision electronic current limiter is preferably used, which has an operational amplifier as a part of its control circuit. A possible basic design of such an electronic current limiter is known from, e. g., U.S. Pat. No. 4,800,331. The semiconductor series pass element may be a bipolar or field effect transistor. The current is sensed by monitoring the voltage drop across a low ohm resistor in series with the semiconductor series pass element.

To protect the DC-to-DC converter from high input voltages, the electronic current limiter preferably further comprises an overvoltage sensor, and the control circuit is configured to be further responsive to the overvoltage sensor for providing the control signal to the semiconductor series pass element.

To prevent the DC-to-DC converter from powering up before a minimum input voltage is reached, the electronic current limiter preferably further comprises an undervoltage sensor; the control circuit is further responsive to the undervoltage sensor for providing the control signal to the semiconductor series pass element. As long as the sensed voltage is below the minimum input voltage, the series pass element is controlled to block current flow.

The electronic current limiter may further comprise a turn-on delay circuit to allow for the current to rise slowly; the control circuit is then further responsive to the turn-on delay circuit for providing the control signal to the semiconductor series pass element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now described, by way of example, with reference to the accompanying drawings, in which.

DETAILED DESCRIPTION OF THE PREFERRED EMBODIMENTS

Figure 1:
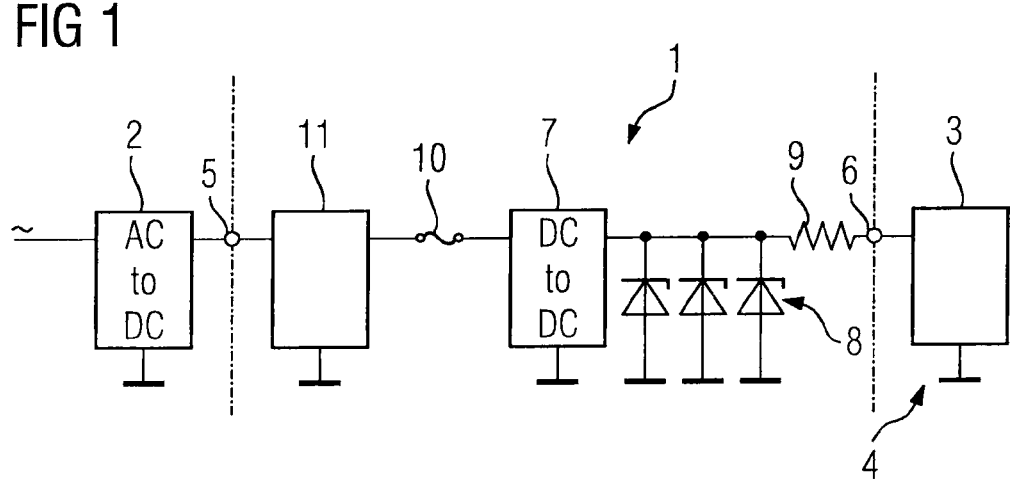
FIG. 1 is a schematic block diagram illustrating an intrinsically safe energy limiting circuit in accordance with a first embodiment of the present invention.

FIG. 1 shows an intrinsically safe (IS) energy limiting circuit 1 which is upstream connected to a DC power source 2 and downstream connected to an electrical load 3 to be powered from the DC power source 2. The electrical load 3 may be any device, system, circuit or part thereof which is subject to one or more IS standards, including but not limited to IEC 60079-11, FM 3610, and UL 913, and located in a hazardous area 4 where explosive and/or flammable gas may be present. The energy limiting circuit 1 and electrical load 3 may be separate devices or they may be integrated into one device. The DC power source 2 is a non-IS device or system that does not, or is not required to, meet IS standards.

The energy limiting circuit 1 has an input 5 to which the DC power source 2 is connected and an output 6 to which the electrical load 3 is connected. The upstream DC power source 2 provides a voltage which is higher than the voltage required by the downstream electrical load 3. The energy limiting circuit 1 therefore includes a switch-mode DC-to-DC converter 7 to reduce the input voltage level which, in the present example, is normally 24 V but may vary, to a consistently controlled output voltage of, e.g., 18 V. Suitable DC-to-DC converters are also known as step-down voltage regulators and are widely available with fixed output voltages and as adjustable output versions. A zener barrier 8 limits the voltage provided to the electrical load 3 if the DC-to-DC converter 7 fails. The zener barrier 8 comprises at least one, preferably three, zener diodes which have a zener voltage of, e.g., 20 V±5%. To prevent current from normally flowing in the zener barrier, the output voltage of the DC-to-DC converter 7 and the zener voltage are selected such that the minimum zener voltage (19 V) exceeds the nominal DC output voltage (18 V). A series resistor 9 between the zener barrier 8 and the output 6 provides instantaneous current limiting to prevent sparking or arcing when the current to or in the electrical load 3 is interrupted. The series resistor 9 is actually not always necessary, or it may follow the electrical load 3, depending upon what capacitance and/or inductance is in the electrical load 3.

As the voltage at the output 6 is limited to the zener voltage, the output current is also limited by the series resistor 9 even if both the DC power source 2 and the DC-to-DC converter 7 fail and AC mains voltage gets to the zener barrier 8. However, in this case the current through the zener barrier 8 must be limited. For this purpose, an intrinsically safe fuse 10 is provided upstream the DC-to-DC converter 7. In the example shown here, the fuse rating is 200 mA. As explained above, the input current of the DC-to-DC converter 7 may exceed the fuse rating when the input voltage is low or when the DC-to-DC converter 7 is powering up. To limit the current to a maximum value, such as, 190 mA, below the fuse rating, an electronic current limiter 11 is connected between the input 5 and the fuse 10.

Figure 2:
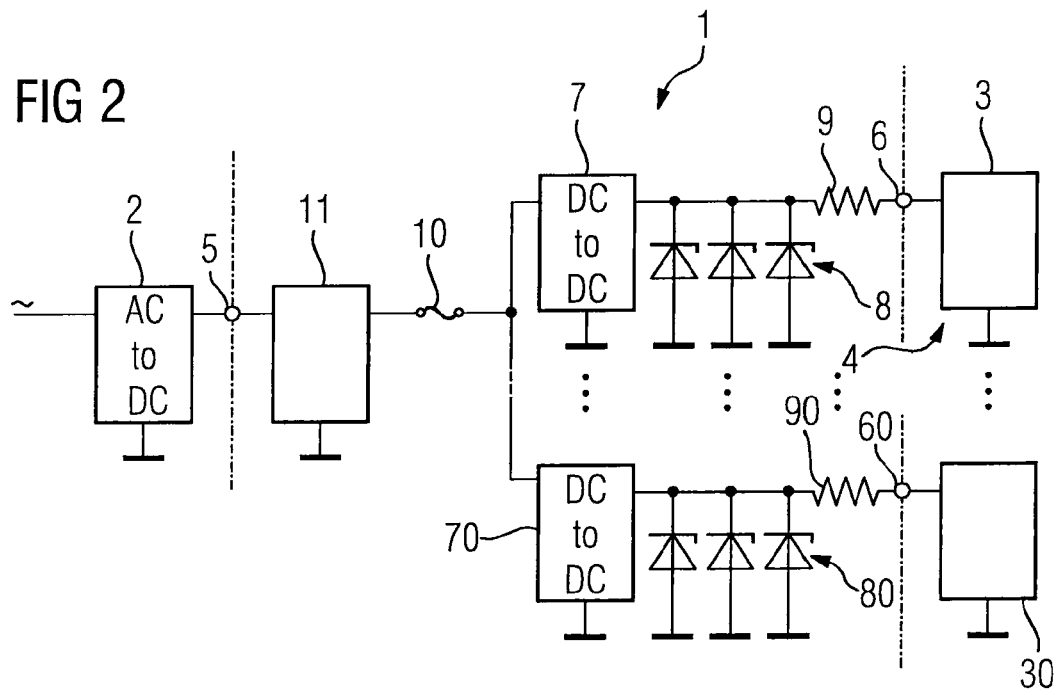
FIG. 2 is a schematic block diagram illustrating an intrinsically safe energy limiting circuit in accordance with a second embodiment of the present invention.

FIG. 2 shows a second embodiment of the present invention where the energy limiting circuit 1 of FIG. 1 is expanded to intrinsically safe power at least one further electrical load 30 at a respective further output 60. To that end, at least one further DC-to-DC converter 70 is downstream connected to the fuse 10, the voltage provided to the further electrical load 30 is limited by a further zener barrier 80, and the output current to the further electrical load 30 is limited by a further series resistor 90 between the further zener barrier 80 and the further output 60. The further DC-to-DC converter 70 is configured to convert the DC input voltage to the voltage required by the further electrical load 30. The further electrical load 30 is an IS device, system, circuit or part thereof. Thus, electrical loads 3 and 30 may be separate circuits or parts of a larger circuit with two different voltage supplies.

Figure 3:
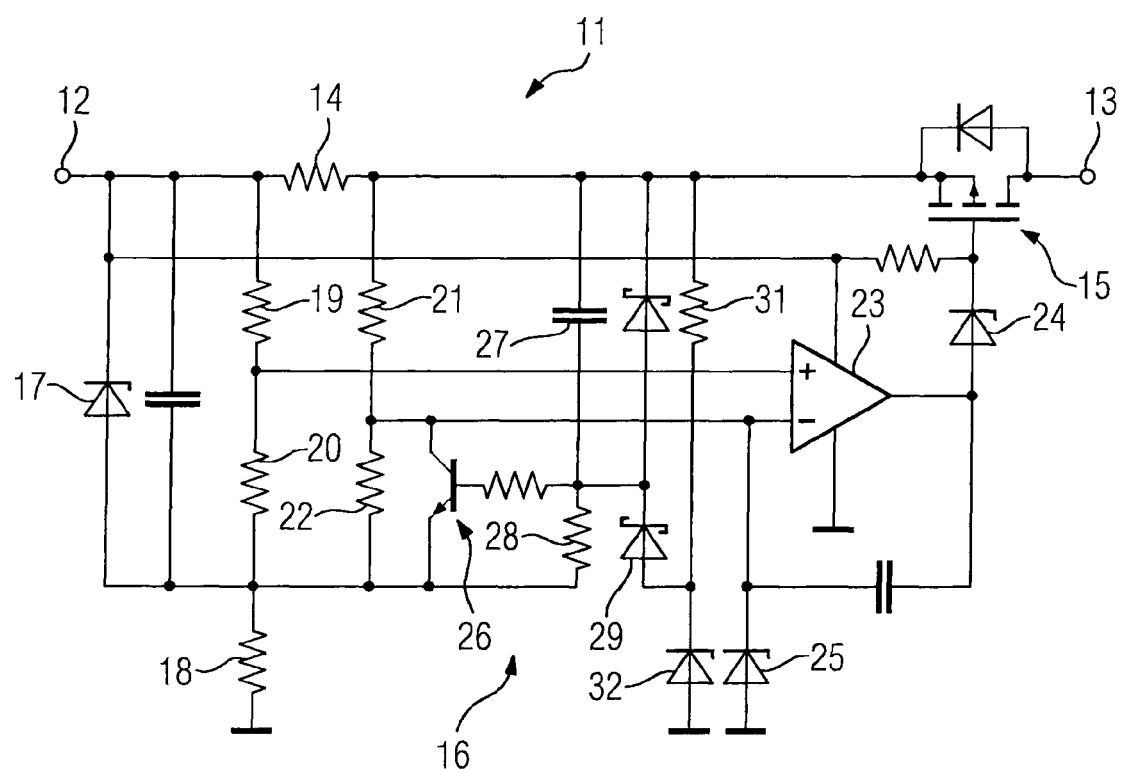
FIG. 3 is an embodiment of a precision electronic current limiter as a component of the circuit of FIG. 1 or FIG. 2.

FIG. 3 shows a more detailed schematic diagram of an embodiment of the electronic current limiter 11. The electrical current limiter 11 has an input node 12 to be connected to the DC power source 2 and an output node 13 to be connected to the fuse 10. The current from the input node 12 to the output node 13 is monitored by a low ohm resistor 14 which is in series with a semiconductor series pass element 15, here for example a field effect transistor (FET). A control circuit 16 which is responsive to the sensed current provides a control signal to the FET 15 for limiting the current to a maximum value if the current reaches this value. A zener diode 17 (alternatively, a voltage reference circuit) which is connected to the input node 12 and via a resistor 18 to ground (mass) clamps the supply voltage for the control circuit 16 and provides a stable reference voltage and supply voltage for the control circuit 16. The control circuit 16 has a first voltage divider comprising resistors 19, 20 upstream the current sensing resistor 14 and dividing the voltage reference value provided by the zener diode 17, and downstream a second voltage divider comprising resistors 21, 22 and dividing the voltage reference value of 17 with respect to the a voltage reflective of the current through resistor 14 and referenced to 17. The tap of the first voltage divider is connected to a non-inverting input of an operational amplifier 23, the inverting input of which is connected to the tap of the second voltage divider. The output of the operational amplifier 23 controls the FET 15 via a zener diode 24 to turn on or off depending on the differential voltage between the taps of the voltage dividers. Zener diode 24 is used to limit the maximum gate to source rating of the FET 15. The current limit trip point is determined by the resistance ratios of the voltage dividers and the voltage drop resulting from the current in the resistor 14.

In order to limit not only the current but also the voltage supplied to the DC-to DC converter, a zener diode 25 is connected between the inverting input of the operational amplifier 23 and ground. The zener diode 25 in combination with resistor 21 forms an overvoltage sensor. When the voltage downstream the resistor 14 exceeds the zener voltage, the zener diode 25 will conduct and limit the voltage at the inverting input of the operational amplifier 23.

To prevent the DC-to-DC converter from powering up before a minimum input voltage is reached, a shunt transistor 26 is connected parallel to resistor 22 of the second voltage divider. The base of the transistor 26 is connected to the center tap of an RC timing circuit comprising a capacitor 27 and a resistor 28. The center tap of the RC timing circuit is connected via a diode 29 to the junction of a series connection of a resistor 31 and a zener diode 32. At a low input voltage, the zener diode 32 is not conducting and acts as an open circuit. In this case, resistor 31 pulls the voltage up through diode 29 to act on transistor 26 to hold the circuit off. At the same time, capacitor 27 is held from charging, such that the start up delay will not enact until the input voltage has risen to the point that zener diode 32 will start to conduct some of the current from resistor 31. When the input voltage starts to exceed the zener voltage of zener diode 32, diode 29 becomes reverse biased and no longer has influence on transistor 26. Likewise, the time delay imposed by capacitor 27 is allowed to start, as diode 29 is no longer holding the capacitor 27 in a discharged state. Thus, components 26, 29, 31 and 32 form an under voltage sensor, and components 26, 27 and 28 form a delay circuit.

While there have been shown and described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An intrinsically safe energy limiting circuit for connection between an upstream DC power source and a downstream electrical load powered from the upstream DC power source, said energy limiting circuit from upstream to downstream comprising:

an input for connection to the upstream DC power source;
an electronic current limiter configured to limit a current through the energy limiting circuit to a maximum value if the current reaches the maximum value;
a fuse designed to open at a current value greater than said maximum value;
a switch-mode DC-to-DC converter configured to convert a DC input voltage to a lower nominal DC output voltage;
a zener barrier having a zener voltage higher than the DC output voltage; and
an output for connected to the downstream electrical load.

2. The energy limiting circuit of claim 1, further comprising for each of at least one further electrical load to be powered:

a further switch-mode DC-to-DC converter downstream connected to said fuse and configured to convert the DC input voltage to a further lower DC output voltage;
a further zener barrier having a zener voltage higher than the further DC output voltage; and
a further output for connection to the further electrical load.

3. The energy limiting circuit of claim 1, wherein the electronic current limiter comprises a current sensor, a semiconductor series pass element in series with the current sensor, and a control circuit including an operational amplifier and being responsive to the current sensor for providing a control signal to the semiconductor series pass element which limits the current through the energy limiting circuit.

4. The energy limiting circuit of claim 2, wherein the electronic current limiter comprises a current sensor, a semiconductor series pass element in series with the current sensor, and a control circuit including an operational amplifier and being responsive to the current sensor for providing a control signal to the semiconductor series pass element which limits the current through the energy limiting circuit.

5. The energy limiting circuit of claim 3, wherein the electronic current limiter further comprises an overvoltage sensor; and wherein the control circuit is further responsive to the overvoltage sensor to provide the control signal to the semiconductor series pass element.

6. The energy limiting circuit of claim 3, wherein the electronic current limiter further comprises an undervoltage sensor; and wherein the control circuit is further responsive to the undervoltage sensor to provide the control signal to the semiconductor series pass element.

7. The energy limiting circuit of claim 5, wherein the electronic current limiter further comprises an undervoltage sensor; and wherein the control circuit is further responsive to the undervoltage sensor to provide the control signal to the semiconductor series pass element.

8. The energy limiting circuit of claim 3, wherein the electronic current limiter further comprises a turn-on delay circuit; and wherein the control circuit is further responsive to the turn-on delay circuit to provide the control signal to the semiconductor series pass element.

9. The energy limiting circuit of claim 5, wherein the electronic current limiter further comprises a turn-on delay circuit; and wherein the control circuit is further responsive to the turn-on delay circuit to provide the control signal to the semiconductor series pass element.

10. The energy limiting circuit of claim 6, wherein the electronic current limiter further comprises a turn-on delay circuit; and wherein the control circuit is further responsive to the turn-on delay circuit to provide the control signal to the semiconductor series pass element.

* * * * *